United States Patent [19]

Wallace

[11] Patent Number: 4,651,080
[45] Date of Patent: Mar. 17, 1987

[54] HIGH EFFICIENCY BATTERY CHARGING SYSTEM

[75] Inventor: Daniel A. Wallace, Germantown, Md.

[73] Assignee: John A. Draper, Crofton, Md.; a part interest

[21] Appl. No.: 566,691

[22] Filed: Dec. 29, 1983

[51] Int. Cl.[4] .................... H02J 7/00; H01L 31/04
[52] U.S. Cl. .................................. 320/2; 136/293; 320/17; 320/61; 323/906
[58] Field of Search ............... 320/15, 17, 2, 40, 61; 323/906; 136/293

[56] References Cited

U.S. PATENT DOCUMENTS

| | | | |
|---|---|---|---|
| 3,280,397 | 10/1966 | Bruns | 320/17 X |
| 3,305,754 | 2/1967 | Oaks et al. | 320/40 X |
| 4,080,221 | 3/1978 | Manelas | 320/2 X |
| 4,175,249 | 11/1979 | Gruber | 323/906 X |

OTHER PUBLICATIONS

Luque et al "Project of the Ramon Areces" Concentrated Photovoltaic Power, Station", Thirteenth IEEE Photovoltaic Conf., Wash., DC, Jan. 1978, pp. 1139–1146.

Primary Examiner—R. J. Hickey
Attorney, Agent, or Firm—Lowe Price LeBlanc Becker & Shur

[57] ABSTRACT

A rechargeable battery array comprises a plurality of rechargeable battery cells (10)–(16) connected in series, and in equal plurality of charging sources (18)–(24) connected in series. Corresponding terminals of corresponding battery cells and charging sources are interconnected. The internal resistance of each of the charging sources is matched to the internal resistance of each battery cell. The configuration provides substantially faster charging of the battery cells than is possible using conventional battery cell array charging configurations. The invention is particularly well suited to photo-voltaic charging systems.

4 Claims, 4 Drawing Figures

4,651,080

HIGH EFFICIENCY BATTERY CHARGING SYSTEM

TECHNICAL FIELD

The invention relates generally to rapid charging of pool batteries, and more particularly, toward high efficiency charging of pool batteries using photo-voltaic cell arrays.

BACKGROUND ART

Photo-voltaic solar energy is produced by converting sunlight into electricity through photovoltaic, or solar, cells. These cells are formed of purified silicon, doped during growth with phosphorous and boron to form a p-n junction. Cylinders of the doped silicon are sliced into wafers and plated with a conductive pattern to produce solar cells. The specific configuration of an exemplary silicon solar cell is shown in Milnes, *Semiconductors and Integrated Electronics*, Van Nostrand, Reinhold Company, 1980, Section 12.2, incorporated herein by reference.

As light falls on a solar cell, red light penetrates deep and blue light is absorbed just below the surface of the cell. Under illumination by light, the p-n junction tends to develop a junction-depletion region which causes electrons induced in the p-region to move to the n-region, producing electricity. The magnitude of current is described by the Shockley model described in section 12.2.2 of the Milnes text, supra.

In a conventional solar power system, solar energy is absorbed by an array of photo-voltaic solar cells that generate a substantial direct current applied to a battery through a control regulator. In practice, each cell of a battery has an electrical potential of approximately 2.12 volts. The battery cells are connected in series to produce higher working voltages. A 12 volt battery, for example, consists of 6 cells whereas a 120 volt battery constitutes 60 cells.

In a conventional solar cell array, each cell of the battery is connected in series and each photo-voltaic cell is connected in series. Thus, if there are 6 cells in a battery, there are 36 photo-voltaic cells and six battery cells connected in series.

The efficiency of this configuration is relatively low. Bearing in mind that the maximum conversion efficiency of a conventional photo-voltaic cell is on the order of under 10% it is important to maximize energy transfer between photovoltaic cells and battery cells, to make photo-voltaic energy conversion systems practical.

DISCLOSURE OF INVENTION

Accordingly, one object of the invention is to provide a highly efficient system for charging battery cells.

Another object is to provide a new and improved, rapid charging system for battery cells.

A further object is to provide a new and improved system for rapidly charging battery cells using a photo-voltaic cell array.

The above and other objects are satisfied, in accordance with the invention, by a rechargeable battery array, comprising a plurality of rechargeable battery cells connected in series and a plurality of battery charging sources connected in series. Corresponding terminals of corresponding cells and sources are interconnected. This configuration minimizes the internal resistance of the charging circuit, providing a substantial increase in power transfer between the charging sources and battery cells than is possible in the prior art.

In accordance with another aspect of the invention, the battery cells are connected in series with each other within a pool battery, and photo-voltaic cells, connected in series with each other within a photo-voltaic array, are interconnected with the cells of the pool battery. Corresponding terminals of corresponding battery cell, photo-voltaic cell pairs are directly interconnected with each other for maximum power transfer.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various, obvious respects, all without departing from the invention. Accordingly, the drawings and description are to be regarded as illustrative in nature, and not as restrictive.

BEST MODE FOR PRACTICING THE INVENTION

The invention substantially reduces the charging time of battery cells, compared to the prior art, by providing a unique manner of interconnecting photo-voltaic cells or other charging sources and the battery cells. The circuit configuration establishes a reduced internal resistance, enabling rapid charging of the battery cells. In addition, the cells are recharged, even if there is failure of one or more of the photo-voltaic cells.

Figure 1:
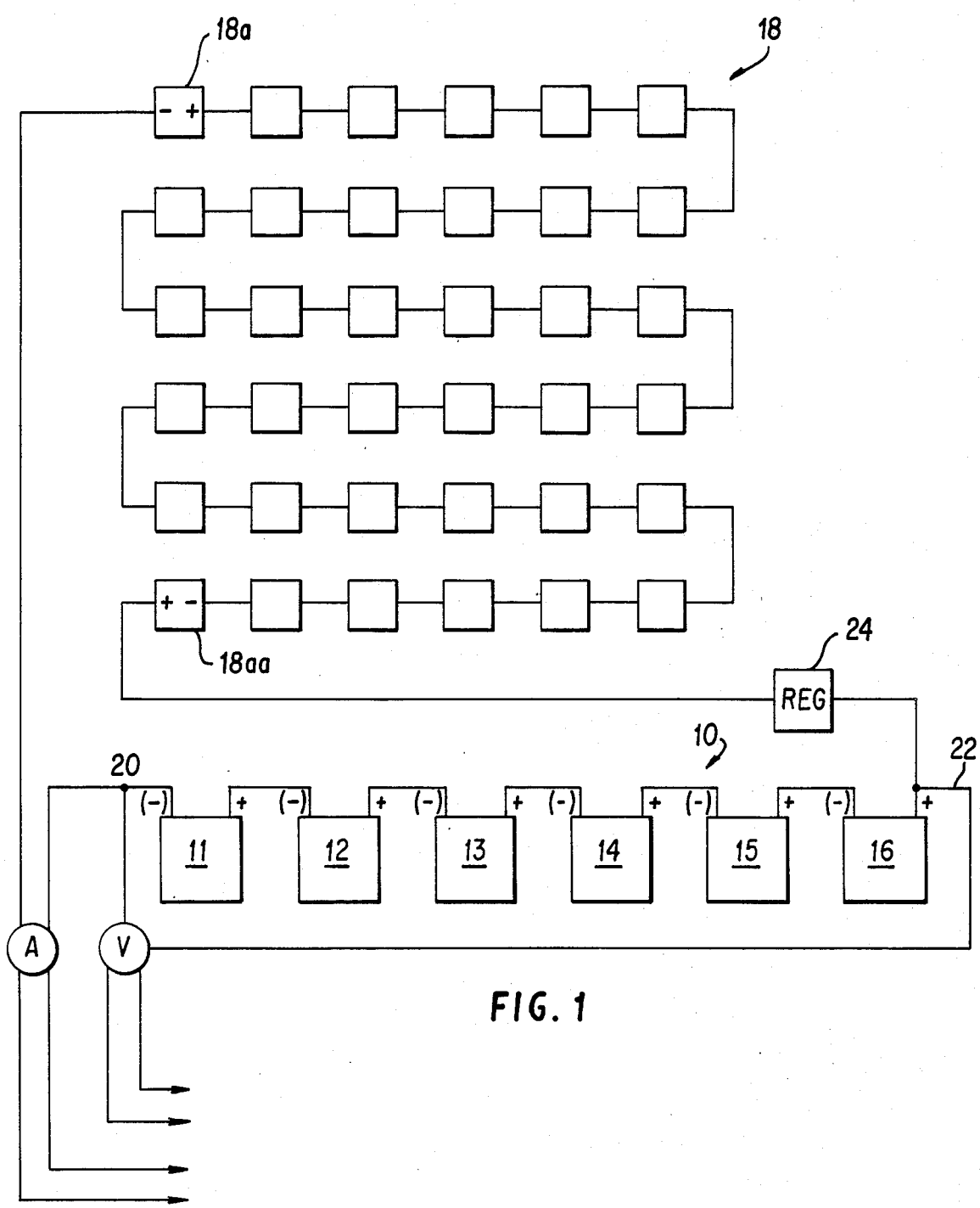
FIG. 1 is a circuit diagram showing a conventional photo-voltaic battery charging system of the prior art.

Referring to FIG. 1, a pool battery 10 comprises six battery cells 11-16 connected in series. Each cell, fully charged, has a cell voltage of about 2 volts, for a total pool battery voltage of 12 volts. Each cell has an internal resistance that depends on a number of different factors, such as the size and chemical makeup of the cell and cell temperature.

Also connected in series are thirty-six conventional photo-voltaic cells 18. The photo-voltaic cells 18, responsive to sunlight, each develop an open circuit voltage of approximately 0.55 volt, for a total open circuit array voltage of approximately 19.8 volts.

The negative (−) terminal of the first photo-voltaic cell 18a of the array 18 and the negative (−) terminal of battery 11 are interconnected to form a negative output terminal 20. Similarly, the positive (+) terminal of the last photo-voltaic cell 18aa of the array and the positive (+) terminal of battery cell 16 are interconnected to form a positive output terminal 22. When the array 18 is exposed to sunlight, the array voltage, being geater than the fully charged terminal voltage of pool battery 10, supplies current to the pool battery for charging. A regulator 24 interposed between the photo-voltaic cell array 18 and the pool battery 10 controls the amount of charging current applied by the array to the pool battery, and protects the pool battery from becoming overcharged.

Figure 2:
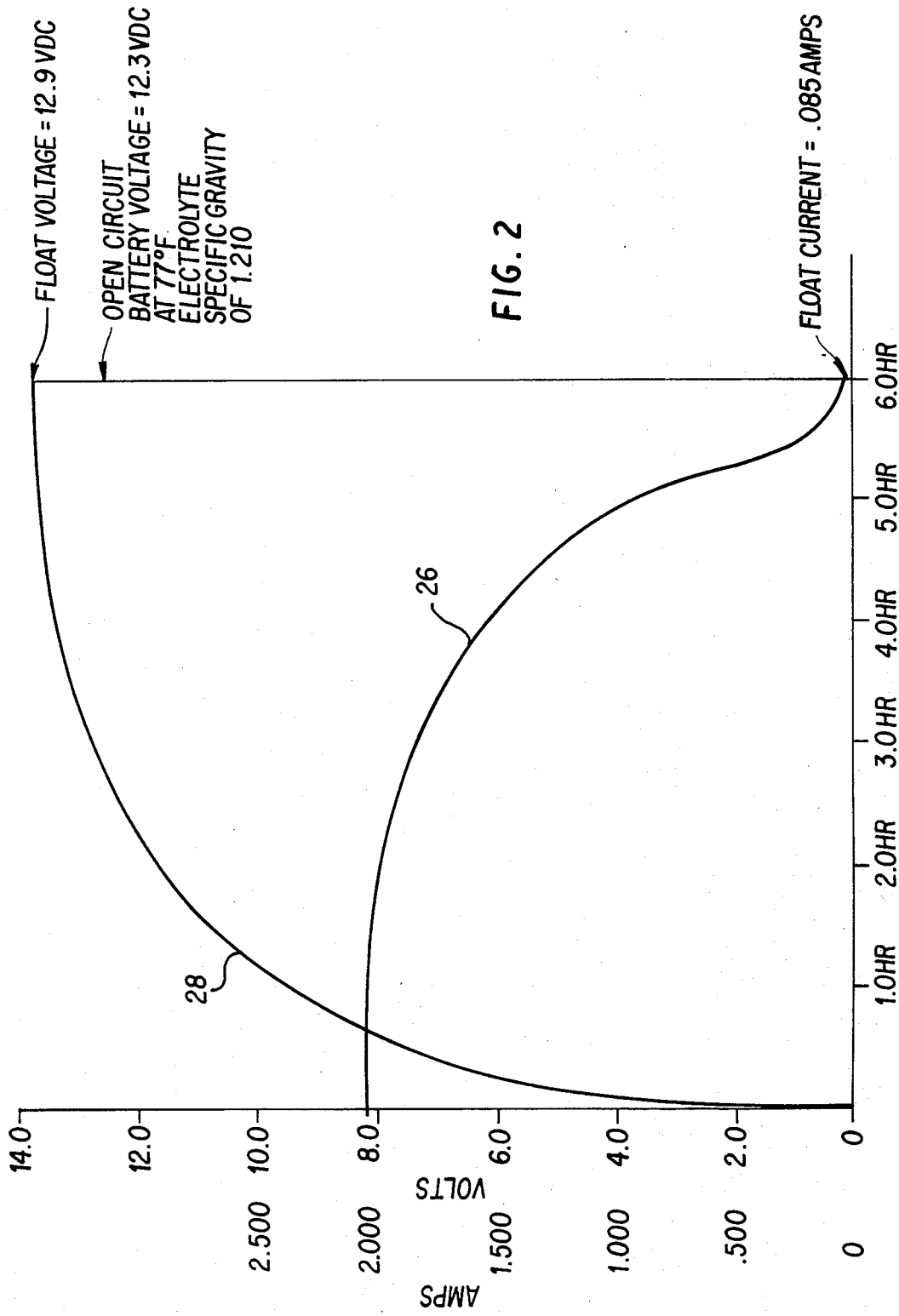
FIG. 2 is a graph showing charging current and battery voltage as a function of time in the prior art circuit shown in FIG. 1.

Referring to FIG. 2, the line 26 represents charging current applied by the conventional photo-voltaic cell array 18 to pool battery 10. Pool battery 10 is initially fully discharged and is charged until the battery has an electrolyte specific gravity of 1.210. The graph line 26 represents a standard 12 volt, 10 ampere hour system of a type such as the Solarex Model #PL100, having an open circuit battery voltage of 12.3 volts DC and a float voltage of 12.9 volts DC with an electrolyte specific gravity of 1.210 at 77° F. The initial charging current is 2.05 amperes, decaying to 0.085 ampere after a charging time of six hours. Battery voltage, indicated by graph line 28, rises from approximately 0 volt to the float voltage of 12.9 volts DC monotonically during the six hour charging period.

Charging current is measured by ammeter A in FIG. 1, connected in series with the photo-voltaic array 18 and pool battery 10. The battery voltage is measured by a voltmeter V connected across battery output terminals 20, 22.

Figure 3:
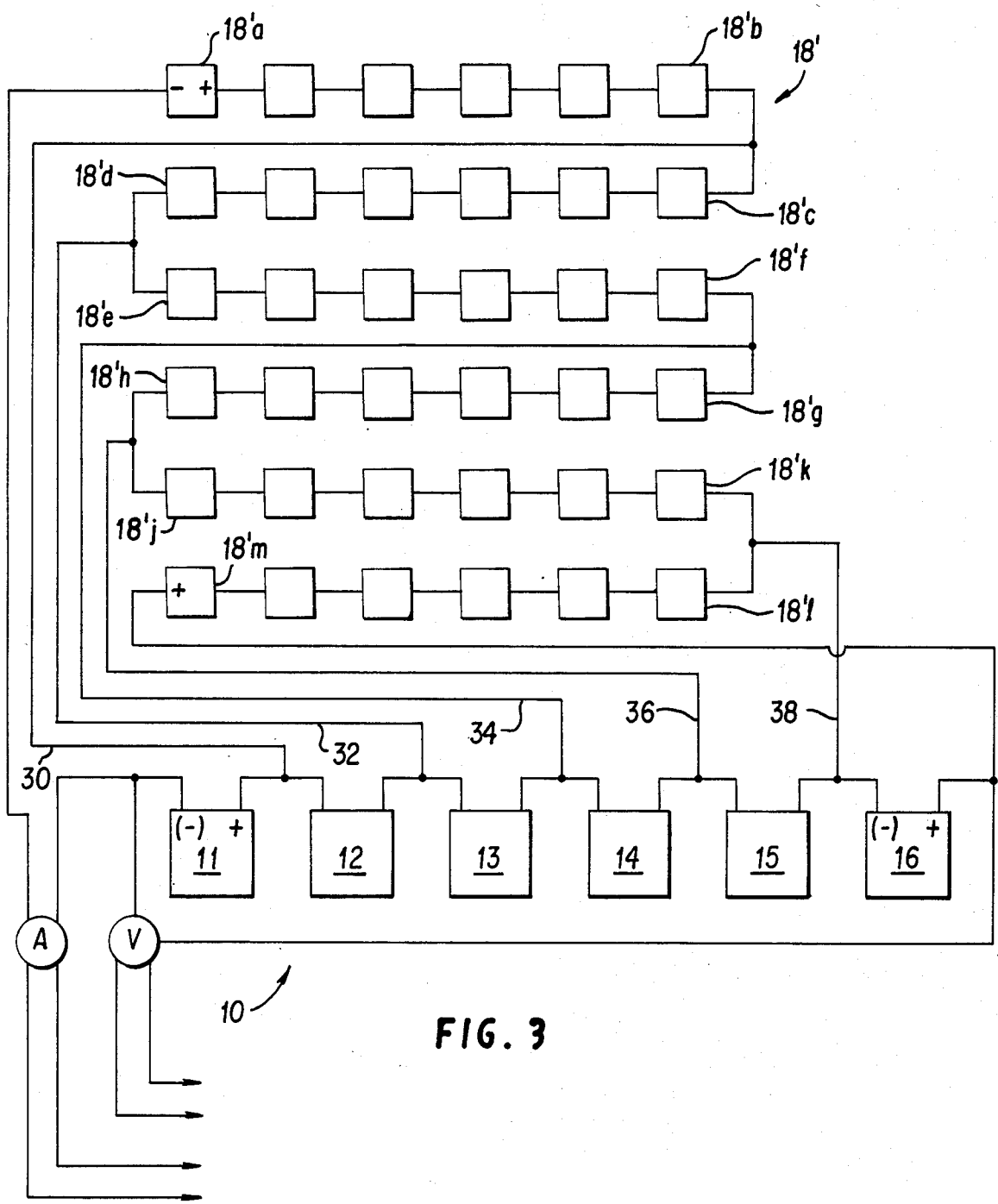
FIG. 3 is a circuit diagram showing a photo-voltaic battery charging system in accordance with the invention.

Referring now to FIG. 3, the photo-voltaic array 18' is a modification of the array 18 shown in FIG. 2, with the array connected in series-parallel rather than in series with the pool battery 10. I have found that the series-parallel connection of the photo-voltaic cell array 18' and pool battery 10 lowers the effective internal resistance of the array and thereby substantially improves efficiency of current charging of the battery cells.

Thus, in accordance with the invention, a wire 30 interconnects the junction between battery cells 11 and 12 and the junction between photo-voltaic cells 18'b and 18'c. Similarly, a second wire 32 interconnects the junction between battery cells 12 and 13 and the junction between photo-voltaic cells 18'd and 18'e. Wire 34 interconnects the junction between battery cells 13 and 14 and the junction between photo-voltaic cells 18'f and 18'g and wire 36 interconnects the junction between battery cells 14 and 15 and the junction between photo-voltaic cells 18'h and 18'j. Finally, wire 38 interconnects the junction between battery cells 15 and 16 and the junction between photo-voltaic cells 18'k and 18'l. Outputs from the array are taken, respectively, from the first and last photo-voltaic cells 18'a and 18'm of the array.

In other words, the array 18' is sectionalized into six sets of six photo-voltaic cells each, with each set being connected in series with neighboring sets and being connected in parallel to a corresponding one of cells 11–16 of pool battery 10.

Figure 4:
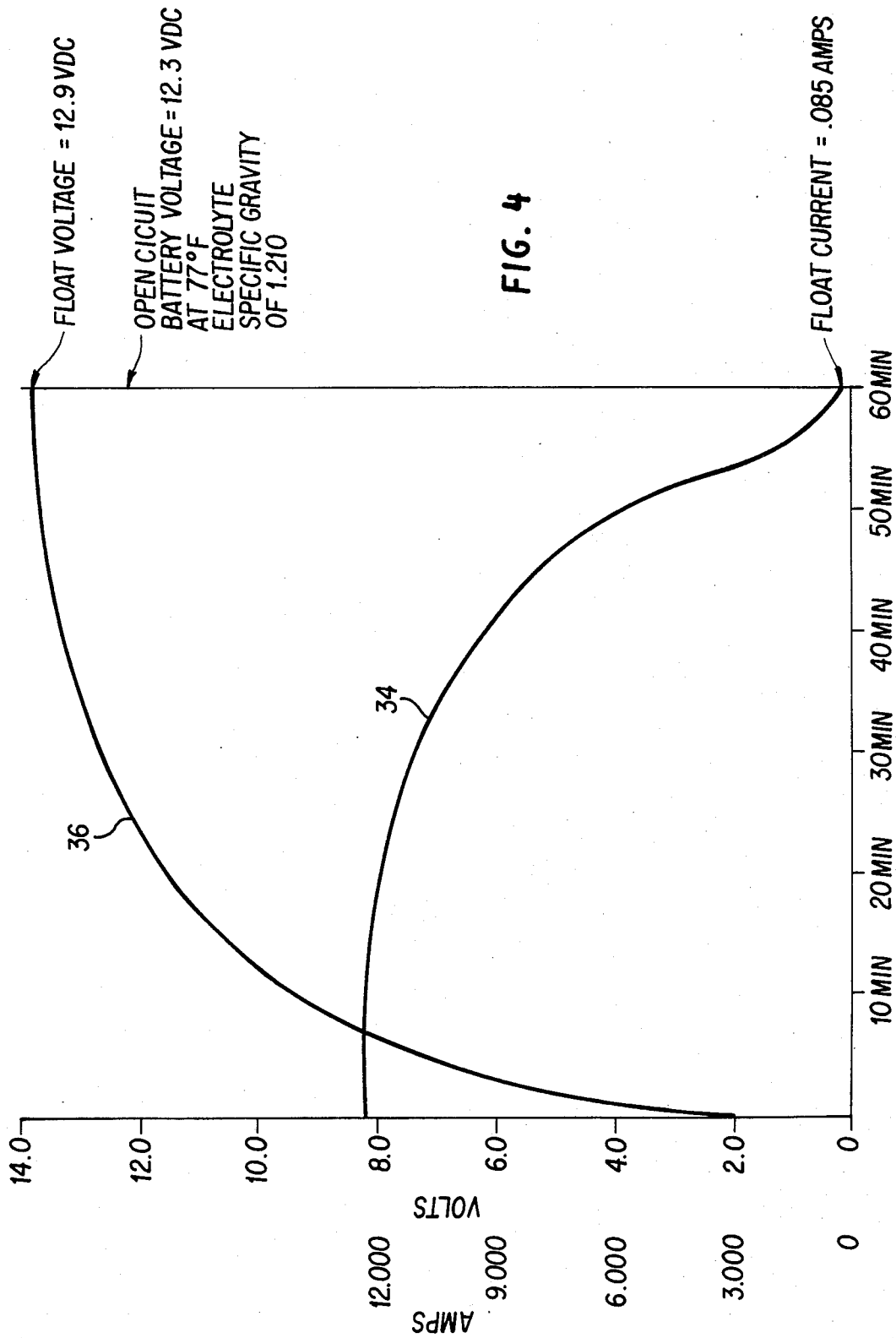
FIG. 4 is a graph showing charging current and battery voltage as a function of time in the circuit of FIG. 3.

FIG. 4 illustrates the current and voltage charging profiles of the battery cells 11–16, using the photo-voltaic array 18' in FIG. 3. With the battery cells initially fully discharged, and the photo-voltaic cell array 18' exposed to sunlight, the battery charging current is initially at approximately 12.3 amperes. The charging current decreases monotonically to the float or trickle charge current of 0.085 ampere within sixty minutes, as shown by the graph line 34.

The voltage, shown in graph line 36, increases monotonically from an initial, fully discharged, voltage of approximately 0 to the 12.9 volt float voltage during the sixty minute time period. Thus, comparing the current and voltage charging profiles of FIGS. 2 and 4, it is apparent that the charging circuit of FIG. 3 is substantially more efficient than the prior art charging circuit of FIG. 1. This is attributed by the lower effective internal resistance of the photo-voltaic array 18' compared to that of array 18 in FIG. 1 which is simply a summation of the internal resistance of each cell.

Furthermore, in the event that one or more of the photo-voltaic cells of the array 18' fails by developing an open circuit, the remaining photo-voltaic cells will continue charge the battery 10. This is in contrast with the prior art configuration shown in FIG. 1, wherein an open circuit in any one of the photo-voltaic cells will totally disable the photo-voltaic cell array 18.

The foregoing description of the preferred embodiment of the invention has been presented for purposes of illustration and description. It is not intended to be exhaustive or to limit the invention to the precise form disclosed, since many obvious modifications and variations are possible in light of the above teaching. The embodiment described was chosen in order best to explain the principles of the invention and its practical application, thereby to enable others skilled in the art best to utilize the invention in various embodiments and with various modifications as are best suited to the particular use contemplated. It is intended that the scope of the invention be defined by the claims appended hereto, when interpreted to obtain the full breadth to which they are fully and legally entitled. For example, it is apparent that although photovoltaic cells constitute the battery charging array in the description, any other sources of charging current can be used. Furthermore, any number of charging sources as well as battery cells can be applied using the principles of the invention.

I claim:

1. A solar powered battery charging system, comprising a series string of n rechargeable battery cells, a plurality of series strings of charging sources of m solar cells each, and means for connecting a different one of said strings of m solar cells directly across each of said n battery cells for bidirectional current flow between connected battery cells and strings of solar cells to provide shared charging of each of said battery cells by all of said solar cells.

2. A solar powered battery charging system, comprising a series string of n unloaded, rechargeable battery cells, a plurality of series strings of charging sources of m solar cells each, and means for connecting a different one of said strings of m solar cells directly across each of said n battery cells for bidirectional current flow between connected battery cells and strings of solar cells to provide shared charging of each of said battery cell by all of said solar cells.

3. In a solar-powered battery-charging system, a battery charging method, comprising the steps of connecting a plurality of rechargeable battery cells in series; connecting across each said battery cell respectively a different plurlaity of series connected solar-cells for bidirectional current flow, and exposing the solar-cells to sunlight, whereby each of said battery cells is charged sharingly by all said solar-cells.

4. The method of claim 3, wherein said battery cells ar maintained unloaded during battery charging.

* * * * *